United States Patent [19]

Nathan et al.

[11] 4,374,005
[45] Feb. 15, 1983

[54] METHOD FOR FABRICATING A TRANSVERSE MAGNETIC PRINTING HEAD

[75] Inventors: Bernard D. Nathan, Liverpool; Donald R. Witter, Skaneateles, both of N.Y.

[73] Assignee: General Electric Company, Schenectady, N.Y.

[21] Appl. No.: 279,372

[22] Filed: Jul. 1, 1981

Related U.S. Application Data

[63] Continuation-in-part of Ser. No. 40,586, May 21, 1979, Pat. No. 4,291,314.

[51] Int. Cl.³ .......................... C25D 5/02; C25D 5/48
[52] U.S. Cl. ...................................... 204/15; 204/38 E
[58] Field of Search ................... 204/15, 23, 24, 38 E, 204/48

[56] References Cited

U.S. PATENT DOCUMENTS 2,933,436  4/1960  Miller et al. ........................... 204/15
3,575,824  4/1971  Eide ....................................... 204/15
4,082,619  4/1978  Dehnert ................................. 204/15

Primary Examiner—T. M. Tufariello
Attorney, Agent, or Firm—Robert J. Jarvis; James C. Davis, Jr.; Marvin Snyder

[57] ABSTRACT

A method for fabricating high resolution magnetic printing head wherein a comb-like magnetically permeable member is formed by electrodeposition. The magnetic printing head, comprising a substrate with an elongated gap across which conductive lines pass, is formed by electrodeposition of magnetically permeable material between adjacent conductive lines positioned on the substrate. A special jig facilitates electrodeposition by ensuring constant flow of electrolyte through the gap and between the conductive lines during the plating process. A single substrate with its associated gap and conductive lines is employed in certain applications. However, a dual or triple substrate configuration, wherein each substrate and respective conductive lines are aligned with each other, is preferred in a coincident current printing head.

45 Claims, 4 Drawing Figures

METHOD FOR FABRICATING A TRANSVERSE MAGNETIC PRINTING HEAD

This application is a continuation-in-part of application Ser. No. 040,586 filed on May 21, 1979, issued Sept. 22, 1981 as U.S. Pat. No. 4,291,314 and assigned to the same assignee as the present invention.

BACKGROUND OF THE INVENTION

This invention relates to magnetic printing heads, and in particular to a method of manufacturing a high resolution transverse magnetic printing head using electrodeposition to form a comb-like, magnetically permeable structure.

Magnetic printing is a rapid and silent system for producing images of both alpha-numeric and pictorial data. Briefly, magnetic printing involves the transfer of dry magnetic ink from a ferromagnetic recording medium to paper. Magnetic ink is selectively attracted to portions of the magnetic recording medium which have been magnetized with the aid of a recording head which typically possesses a comb-like magnetically permeable structure. Adjacent teeth of the comb-like structure define gaps which facilitate the concentration of magnetic flux at the tips of the teeth. In a transverse printing head, teeth tips are positioned in close proximity to the magnetic recording medium which is conventionally moved past the recording head in a direction perpendicular to the direction of magnetic flux lines between the tips of adjacent teeth of the comb-like structure. Typically, a plurality of current-carrying conductors pass through each gap in the comb-like structure. Current magnitude in the conductors controls the level of magnetic flux at the tips of the teeth. When sufficient current is passed through selected conductors, the increased flux is sufficient to magnetize selected portions of the recording medium which thereafter attract magnetic ink as the medium passes a magnetic ink dispensing brush assembly. In this manner, the latent magnetic image impressed on the recording medium by the recording head is made visible. The inked recording medium is then, typically, passed between heated rollers having a paper medium disposed therebetween for receiving the magnetic ink from the recording medium. The magnetic recording medium is magnetically erased prior to recording new information thereon. A detailed description of magnetic printing and magnetic printing heads is found in U.S. Pat. No. 4,097,871, issued June 27, 1978 to Berkowitz et al and assigned to the same assignee as the present invention, said patent being incorporated herein by reference.

The resulting printed image quality is directly related to the magnetic printing head resolution which is, in turn, directly related to the spacing between adjacent teeth of the magnetic comb-like structure. At print resolution of approximately 120 gaps or dots per inch, the spacing between adjacent comb teeth and adjacent conductors passing between the teeth is approximately 5 mils. Due to such small tolerances, it is often difficult to insert a conventional comb into the substrate without breaking the delicate conductors or bending the comb teeth. Moreover, if even higher print resolution, such as 200 dots per inch, is desired it does not appear possible to employ conventional comb-like structures.

SUMMARY OF THE INVENTION

The preferred embodiment of the present invention is composed of three insulating substrates each containing an elongated gap and conductive lines disposed across the respective gaps. Preferably, an equal number of conductive lines cross the gap in each substrate. The conductive lines on each substrate are substantially parallel to the lines on other substrates in the region where the conductive lines cross the gap. Each conductive line is aligned opposite a corresponding line on adjacent substrates. The elongated gaps on the substrates are also aligned, such that the configuration defines horizontal spaces between opposed conductive lines on different substrates and vertical spaces between adjacent conductive lines on the same substrate. The vertical spaces between adjacent conductive lines have electrodeposited therein a magnetically permeable material. The horizontal spaces between opposed conductive lines, preferably, are filled with electrically insulating material such as epoxy. The electrodeposition of the magnetically permeable material to form the comb structure in situ obviates the necessity for providing a separate, conventional, magnetic comb structure and permits adjacent comb teeth to be spaced closer together, thereby increasing the resolution and print quality produced by the magnetic printing head.

In accordance with another embodiment of the present invention, the transverse magnetic printing head comprises a single substrate with an elongated gap and conducting lines across said gap, as in the aforedescribed embodiment. Such configuration is useful in applications in which each conductive line is separately driven or in those applications in which a matrix drive is provided but in which the selection of individual lines to be energized is accomplished by circuitry not present in the substrate comprising the printing head.

There is also disclosed herein a method and an apparatus for fabricating by means of electrodeposition the magnetically permeable comb structure. A significant feature of the electrodeposition method of the present invention is that the substrate is immersed in an electrolyte and, preferably, a continuous flow of electrolyte is maintained during the electrodeposition process. Electrolyte flow is maintained through the elongated substrate gap (or gaps, depending upon the embodiment desired), through a jig which acts to direct the electrolyte flow past the cathode plating wire and through the elongated gaps in the substrates and between the conductive lines as they cross the elongated gap or gaps.

Accordingly, it is an object of the present invention to provide a high resolution transverse magnetic printing head having a magnetically permeable member formed by electrodeposition.

It is another object of the invention to provide a method of manufacturing a high resolution magnetic printing head in which a portion of the electroplating apparatus is sacrificed to each magnetic printing head.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE INVENTION

Figure 3:
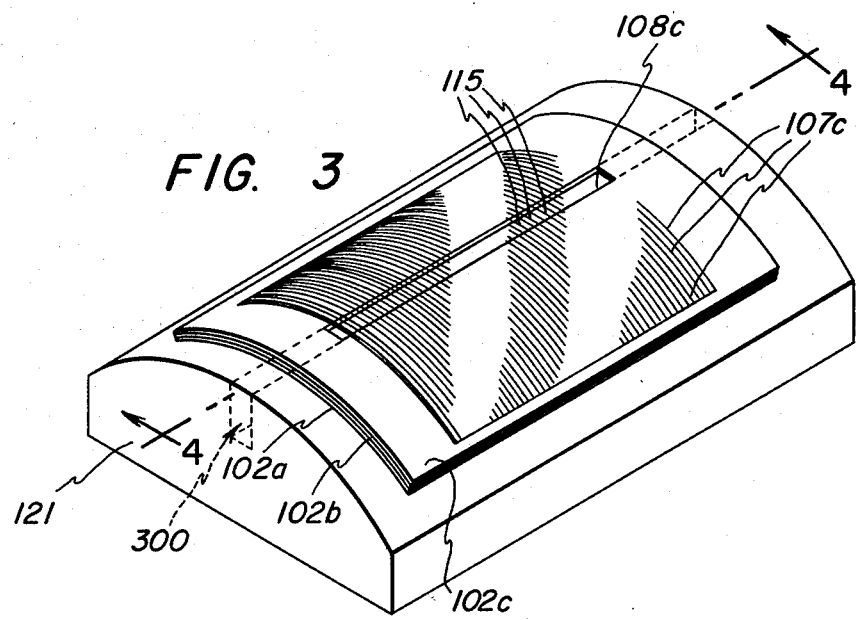
FIG. 3 is a perspective view illustrating an assembled transverse magnetic printing head comprising three substrates and produced in the apparatus of FIG. 1.

To facilitate understanding of the method of producing a transverse magnetic printing head in accordance with the present invention, the configuration of a completed head is described first. In particular, the embodiment employing three substrates for coincident current operation is now discussed. FIG. 3 illustrates first or upper substrate 102c having an elongated gap 108c. Conductive current carrying lines 107c are fabricated on substrate 102c typically by conventional photoresist and etching methods. The conductive lines are nonintersecting, and particularly in the region of gap 108c, lines 107c are insulated with materials such as Parylene or Teflon ®️ resins. Since the particular printing head illustrated in FIG. 3 describes a coincident current, matrix driven printing head, there is also disposed beneath substrate 102c similar substrates 102b and 102a, each having elongated gaps 108b and 108a, respectively (not visible), and conducting line 107b and 107a, respectively, (also not visible). Substrates 102a–102c may comprise many conventional insulating materials such as Mylar ®️ resin or insulated aluminum. The elongated gaps are substantially aligned with one another on substrates having substantially the same dimensions. All conducting lines are substantially parallel to one another and aligned as they cross the elongated gap portions of the substrates. Preferably, there are the same number of conducting lines crossing the elongated gap on each substrate and each conducting line is disposed substantially opposite a conducting line on the other substrates. Thus, there are defined three sets of parallel conducting lines crossing respective gaps in adjacent substrates. Upper substrate 102c and its associated conductive lines 107c are at least partially sacrificial and do not operate as active circuits in the finished magnetic printing head. A portion above line 208 (FIG. 4) of upper substrate 102c is, typically, partially destroyed during a grinding step to produce a smooth head as shown in FIG. 3. The substrates may be conveniently mounted on arched supporting member 121 (FIG. 3), which may comprise, for example, material such as anodized aluminum, for the purpose of positioning the elongated gap portion of the printing head in close proximity to a recording medium (not shown) moving past the head.

The conductive lines crossing the gap in each of the substrates define horizontal spaces 220 (FIG. 4) between opposed conductive lines 202a–202c (different substrates) and vertical spaces 230 between adjacent conductive lines (same substrates). Most significantly in FIG. 4, there is shown magnetically permeable material 115 which has been electrodeposited between adjacent conductive lines in vertical spaces 230. In this fashion, a comb-like structure, similar to that described in the aforementioned patent to Berkowitz et al, is produced in situ. Moreover, the comb-like structure is produced by electrochemical means, rather than assembled by manual methods which are significantly less effective due to the fine spacing between adjacent comb teeth.

Figure 4:
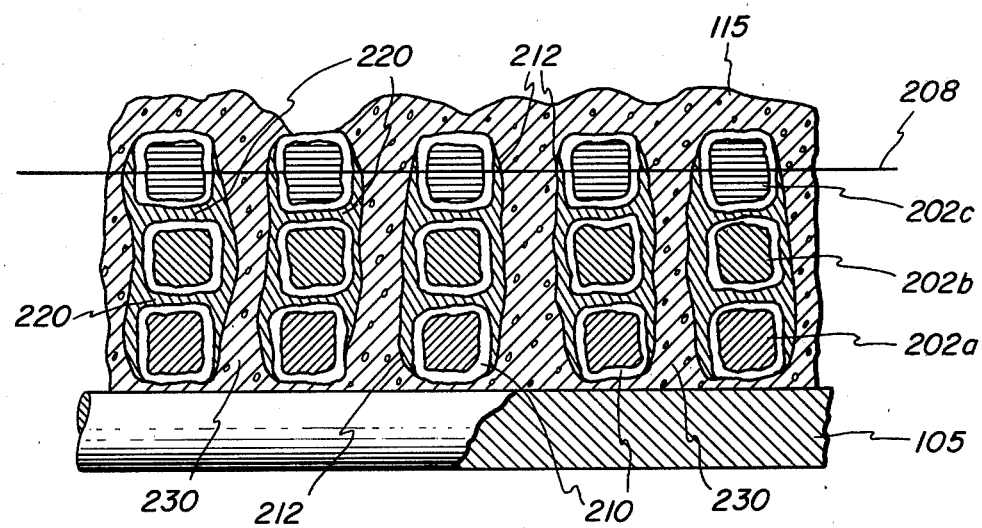
FIG. 4 is a sectional view, taken along line 4—4 in FIG. 3, of the conductive lines as they cross gaps in the substrates after electrodeposition of magnetically permeable material.

FIG. 4 illustrates a sectional view, along line 4—4 in FIG. 3, of a portion of the conductive lines as they cross the gaps in the substrates. The sectional cut is perpendicular to the conductive lines as they cross the gaps. In FIG. 4 there is shown wire cathode 105 above which is a layer of conductive word lines 202a followed by a layer of conductive digit lines 202b and a layer of inactive, sacrificial lines 202c. Each conductive line is surrounded by a nonconductive coating of insulating material 210 such as Teflon or Parylene resins. Also, encapsulating each set of vertical lines is a layer of nonmagnetic insulating material 212 typically comprising epoxy. Thus, epoxy insulation appears between conductive lines on different substrates. Most importantly, there is, disposed in vertical spaces 230 between adjacent conductive lines 202a, 202b, or 202c, magnetically permeable material 115 formed by electrodeposition and typically comprising an amorphous cobalt-phosphorous plating. Epoxy insulation 212 is disposed in horizontal spaces 220 between opposed conductive lines 202c and 202b, for example. As indicated above, the upper layer 202c is sacrificial and during a polishing step material above line 208 is removed.

Figure 1:
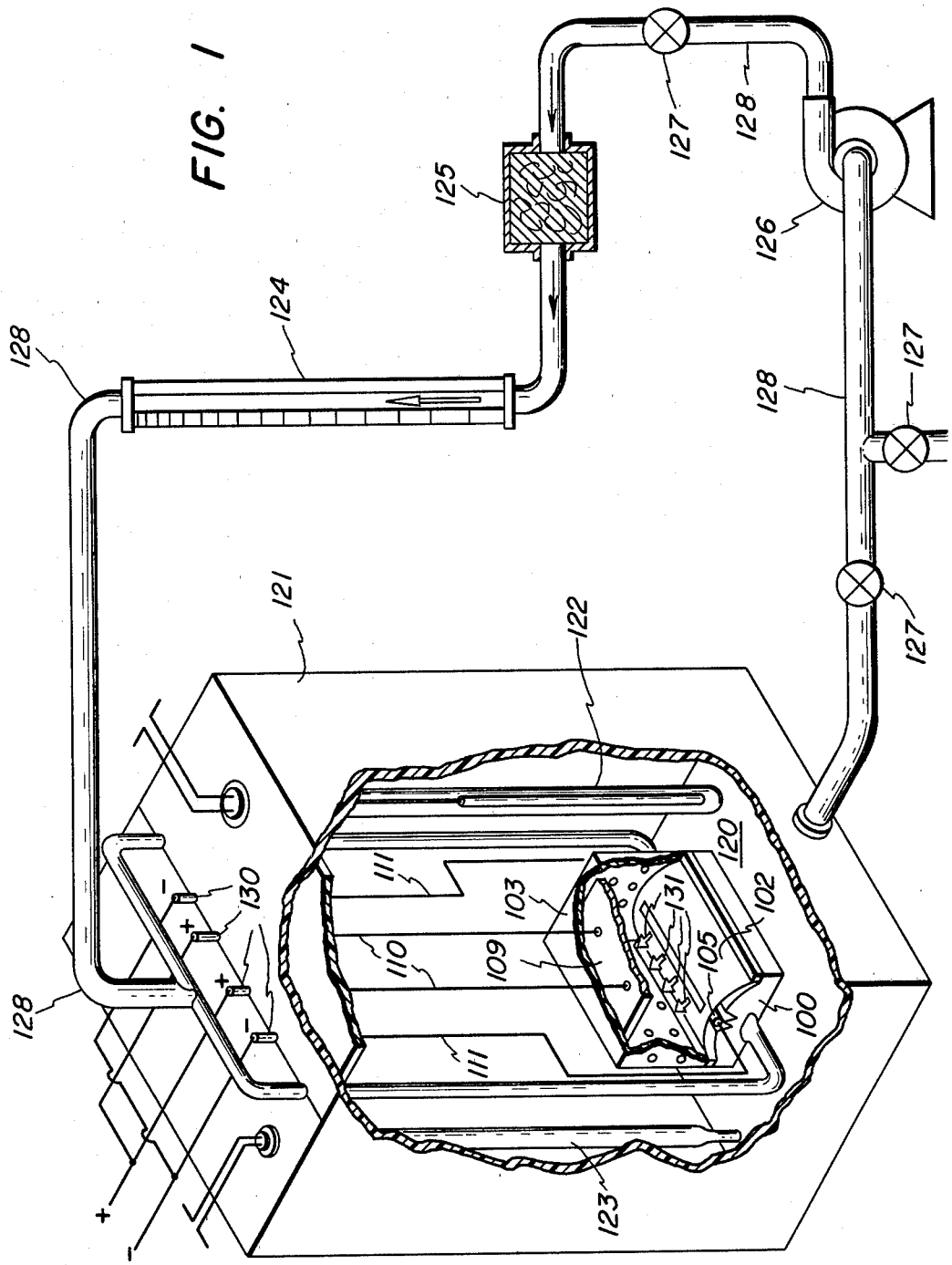
FIG. 1 is a partial sectional perspective view illustrating the apparatus for electrodeposition.

The electrodeposition of magnetically permeable material may be conveniently carried out in an apparatus such as that depicted in FIG. 1 wherein one or more substrates 102 are mounted on a jig 100 which directs the flow of electrolyte 120 through elongated gaps in the substrate and between conductive lines bridging the gap. Jig 100 preferably comprises Teflon or Delrin ®️ resins but may comprise any inert, rigid machinable or extrudable material. Electrolyte 120 is preferably circulated by means of pump 126 through glass or plastic conduit 128. Filter 125 may also be conveniently provided in the flow path for the removal of the particulate matter. Pump 126 is preferably controllable to maintain a constant rate of electrolyte flow, as measured by flowmeter 124. Valves 127 are provided for convenient initial filling of the electrodeposition apparatus and/or for regulating the rate of electrolyte flow. Jig 100, for directing electrolyte flow and for holding one or more substrates, is immersed in electrolyte 120 which is contained in outer vessel 121 having openings therein for electrolyte conduit 128 and for electrodes 130 required for electrodeposition. Also disposed through vessel 121 are a heating element 122 for fine control of electrolyte temperature and an electronic thermometer 123 for measuring electrolyte temperature. Primary heating of the vessel and electrolyte is accomplished by a conventional electric or gas heater (not shown) positioned below the vessel. The top of jig 100 is capped with a cage 103 further serving to control the direction of electrolyte flow toward an anode 109 connected externally by means of leads 110 to the positive terminal of a voltage source. A cathode wire 105 is disposed in the electrolyte flow path immediately beneath the elongated substrate gap and is externally connected to the negative terminal of a voltage source by means of leads 111.

Figure 2:
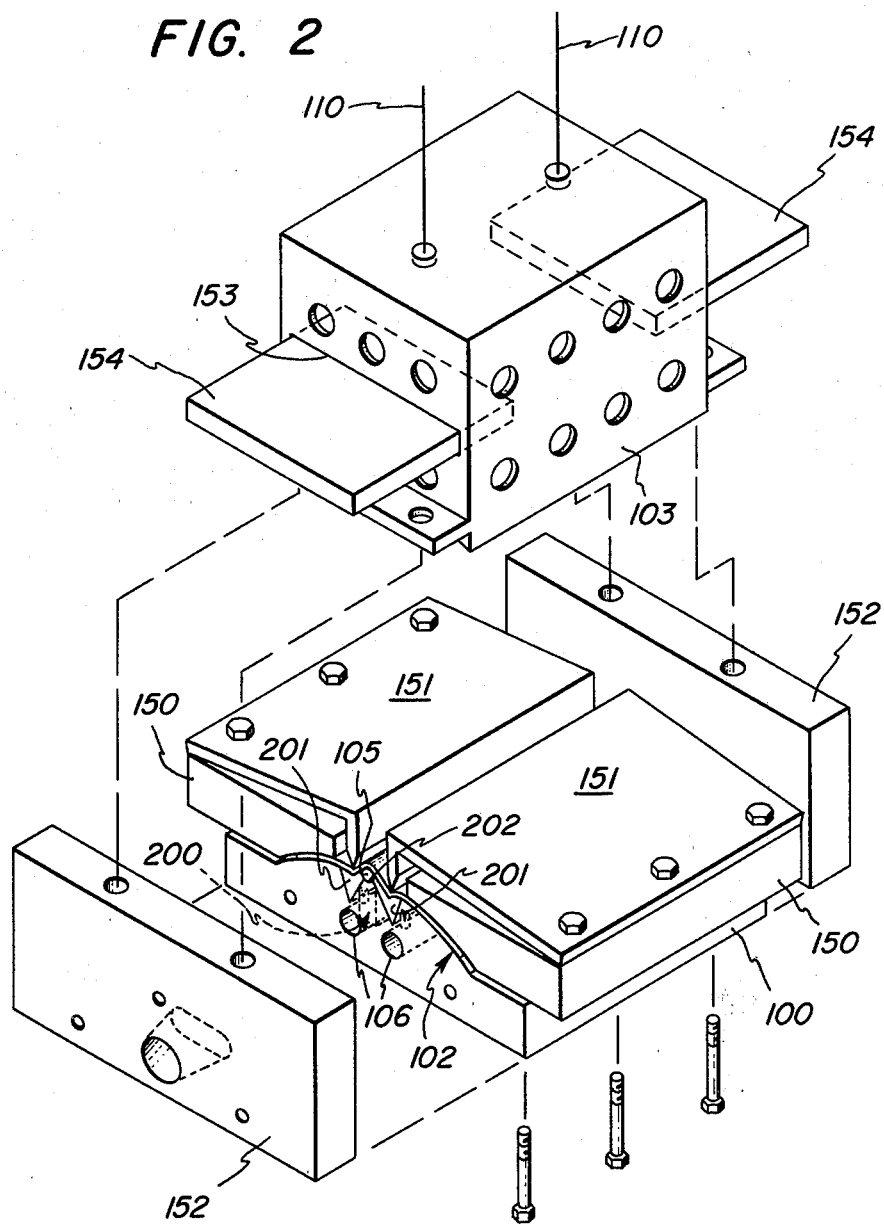
FIG. 2 is a perspective exploded view of a portion of FIG. 1 illustrating details of the substrate and electrodeposition jig.

FIG. 2 is a detailed, exploded view of a portion of FIG. 1 depicting the jig, substrate, and cage assembly. In particular, there are shown channels 106 through jig 100 for promoting even electrolyte flow through substrate 102. One or more substrates 102 may be clamped into jig 100 by means of hold-down members 150, each having a resilient arm clamp 151 mounted thereon to firmly hold the conductive lines against cathode wire 105. The flow of electrolyte is upward through the substrate gap, in the direction indicated by arrows 131 in FIG. 1. To facilitate electrolyte flow, jig 100 has a pair of V-shaped notches 201 along the top arched portion thereof running substantially parallel to the elongated gap in the substrate. Disposed along and upon a center support between notches 201 is cathode wire 105 which preferably comprises nickel-iron wire. The cathode wire is also disposed immediately beneath the elongated gap portion of the substrate. While FIG. 2 shows only a single substrate structure 102 mounted in jig 100, two or three substrates may be simultaneously used to fabricate a magnetic printing head such as shown in FIG. 3. Further details with respect to the method employed to fabricate a printing head having multiple substrates are provided hereinafter.

In the case of either single or multiple substrates, cage 103 preferably comprising an inert material, such as Teflon or Delrin resins, is disposed over substrate 102, as shown in FIG. 2, to further direct electrolyte flow toward anode 109 (FIG. 1) which preferably comprises platinum or cobalt. Cage member 103 (FIG. 2) is conveniently bolted to side members 152 which in turn are bolted to each side of jig 100. Cage 103 also preferably possesses slots 153 through which baffles 154 may be positioned, if desired. Baffles 154 may be provided to reduce the electric field at the ends of the cathode wire by lengthening the current path between the anode and cathode to thereby reduce the tendency for thicker material electrodeposition toward the ends of the cathode wire. However, for a longer magnetic printing head than that illustrated in the figures herein, it is preferable to provide a series of anodes, each with its own controllable electrolytic current.

The electrolyte itself comprises a mixture of water, orthophosphorous acid ($H_3PO_3$), orthophosphoric acid ($H_3PO_4$), cobalt carbonate ($CoCO_3$), and hydrated cobalt chloride ($CoCl_2.6H_2O$). A particularly desirable electrolyte composition per liter of water is: 50 g of orthophosphorous acid, 50 g of orthophosphoric acid, 33.7 g cobalt carbonate, and 185 g of hydrated cobalt chloride. This solution is described in *Amorphous Magnetism* by G. S. Cargill, III and R. W. Cochrane, Plenum Press, New York, 1973, Edited by H. O. Hooper and A. M. De Graeff. Electrolyte flow rate through jig 100 is preferably maintained at approximately 900 ml per minute. The preferred electrolyte temperature is approximately 80° C., while the preferred level of electrical current between the cathode and the anode is approximately 120 milliamperes. The electrodeposited amorphous cobalt-phosphorous alloy has particularly good magnetic properties, which are even further enhanced by post deposition heat treatment.

While the apparatus illustrated in FIGS. 1 and 2 is useful in fabricating magnetic printing heads with single or multiple substrates, additional steps are required in the case of multiple substrate printing heads to prevent the electrodeposition of magnetically permeable material in horizontal spaces 220 (FIG. 4) between opposed conducting lines on adjacent substrates. However, the electrodeposition of magnetically permeable material in vertical spaces 230 between adjacent pairs of conducting lines on the same substrate is desirable. To facilitate the electrodeposition of magnetically permeable material, the substrates in a multiple substrate printing head are adhesively joined with a substance such as epoxy preferably having a relatively slow curing time, for example, approximately 3 minutes. The epoxy is disposed between the substrates and fills vertical and horizontal spaces between adjacent and opposed conductive lines, respectively. The epoxy is then blown out from vertical spaces 230 by means of a pressurized stream of gas such as air. The epoxy or other suitable adhesive remaining in horizontal spaces 220 is permitted to harden and the substrates mounted in jig 100 (FIG. 1). In this manner, horizontal spaces between opposed pairs of conductive lines are filled with hardened epoxy, or other adhesive, which effectively prevents electrodeposition of magnetically permeable material therein, while permitting electrodeposition in vertical spaces.

Following the electrodeposition process, any excess magnetic material along with a portion of sacrificial substrate 108c above line 208, as shown in FIG. 4, may be removed by grinding or polishing. The finished substrate is then preferably mounted on a supporting member such as an arched anodized aluminum support 121 (FIG. 3) to place the teeth of the resulting electrodeposited magnetic comb (in a completed printer head) in close proximity to the magnetic recording surface for recording thereon latent magnetic images. The recording head may be further coated with epoxy or other substance to afford it a greater protection from abrasion or other environmental influences.

A particularly advantageous method of manufacturing the magnetic printing head is to sacrifice plating jig 100 (FIGS. 1 and 2), or at least a portion thereof, to each magnetic printing head. The jig, or sacrificial portions thereof, may conveniently comprise economical extrudable engineering plastics, such as Teflon or Delrin resins. Following electrodeposition of one magnetic comb structure, the sacrificial parts are replaced prior to electrodeposition of a new magnetic comb structure. In this manner, losses due to handling of delicate substrates, conductive lines, and electrodeposited magnetic comb structure may be reduced.

In one embodiment, the entire plating jig 100 (FIG. 2) is potted in epoxy, or a similar substance, after completion of the electrodeposition process. One or more substrates 102 remain on the jig (along with newly electrodeposited magnetic comb structure) and are potted therewith in epoxy, thus avoiding the requirement for separate handling. Further processing, such as grinding (described hereinabove), may proceed with reduced possibility of damage, since the jig provides continued support to fragile parts. If the jig and substrates are potted in sufficient epoxy to place the teeth of the electrodeposited magnetic comb in close proximity to the magnetic recording surface (not shown), the substrates need not be mounted on arched support member 121, as illustrated in FIG. 3.

Alternatively, only a portion of electroplating jig 100 may be sacrificed. In this embodiment, cathode wire 105 (FIG. 2) is provided with a removable support member 200 (illustrated by dashed lines in FIG. 2) positioned in a complementarily shaped channel in jig 100. Following completion of the electrodeposition process, support member 200 (including cathode wire 105), substrate 102, and the magnetic comb structure are removed and mounted on arched support member 121 (FIG. 3), which in this embodiment is provided with a channel 300 (depicted by dashed lines in FIG. 3) for receiving support member 200. A new support member 200 and cathode wire 105 are mounted in jig 100 prior to electrodeposition of a new magnetic comb structure.

Ina multiple substrate magnetic printing head, one active set of conductive lines on one substrate is commonly referred to as the "word lines" and the corresponding lines on another active substrate as the "digit lines". In either case, these lines are preferably insulated, particularly in the region where they cross the gap. While the substrates may comprise any convenient insulating material, they preferably comprise flexible printed circuit material such as Mylar. Moreover, the word and digit lines may be provided on opposite sides of a single substrate.

It should be noted, however, that although an embodiment of the invention has been described in which electrolyte 120 is circulated through jig 100 (FIG. 1), the invention may also be successfully practiced in an electroplating apparatus in which the electrolyte is not circulated. One of the advantages in circulating the electrolyte is the dislodgment of gas bubbles evolved during electrodeposition, thus allowing in a more uniform electrodeposition of magnetically permeable material.

From the above, it may be appreciated that the methods and apparatus of the present invention produce a transverse magnetic printing head for recording high resolution latent magnetic images on a magnetizable recording medium moving relative to the head, while avoiding problems associated with inserting a conventional, delicate, magnetically permeable comb assembly into a substrate having closely spaced conductive lines. The electrodeposition technique of the present invention provides an economical high yield process for producing high resolution printing heads. In order to avoid losses resulting from handling the electrodeposited magnetic comb structure, portions of the electroplating apparatus, such as the jig or portions thereof, may be sacrificed to each magnetic printing head. The sacrificed parts are composed of extrudable plastic materials and are easily and economically replaceable.

While this invention has been described with reference to particular embodiments and examples, other modifications and variations will occur to those skilled in the art in view of the above teachings. Accordingly, it should be understood that within the scope of the appended claims the invention may be practice otherwise than is specifically described.

The invention claimed is:

1. A method of manufacturing a magnetic printing head for recording latent magnetic images on a magnetizable recording medium moving relative to said head, comprising the steps of:
   placing a plurality of nonintersecting, conductive lines on an insulating substrate such that said lines cross an elongated gap in said substrate, said lines being insulated along those line portions crossing said gap; and
   electrodepositing a magnetically permeable material between said conductive lines in the region where said lines cross said gap.

2. The method of claim 1 in which said electrodeposition step comprises:
   securing said substrate and conductive lines in a jig having a wire cathode mounted below and parallel to said gap, and at least one anode mounted above said substrate; and
   immersing said jig including said substrate and conductive lines, in an electrolytic solution while maintaining electrical current flow between said cathode and said anode.

3. The method of claim 2 wherein said electrodeposition step further comprises the step of:
   circulating said electrolytic solution through said jig and past said conductive lines crossing said gap.

4. The method of claim 3 in which said electrolytic solution comprises a mixture of water, orthophosphorous acid, orthophosphoric acid, cobalt carbonate, and hydrated cobalt chloride.

5. The method of claim 4 in which the composition of said mixture per liter of water comprises 50 gm orthophosphorus acid, 50 gm orthophosphoric acid, 33.7 gm cobalt carbonate, and 185 gm hydrated cobalt chloride.

6. The method of claim 3 in which the flow rate of said electrolytic solution is 900 ml/min.

7. The method of claim 3 in which the electrical current between said anode and said cathode is maintained at 120 milliamperes.

8. The method of claim 3 in which said wire cathode comprises nickel-iron wire.

9. The method of claim 3 in which said anode comprises a material selected from the group consisting of platinum and cobalt.

10. The method of claim 3 in which said step of circulating comprises circulating said electrolytic solution through at least one channel formed in said jig so as to direct the flow of said electrolytic solution through said gap in said substrate.

11. The method of claim 3 in which said jig includes a vented cage disposed on a side of the substrate opposite said wire cathode so as to direct the electrolytic solution flow toward said anode.

12. The method of claim 11 in which said vented cage includes baffles disposed therein to promote uniform electrodeposition of said magnetically permeable material.

13. The method of claim 3 further comprising the step of heating said electrolytic solution during said electrodeposition step.

14. The method of claim 3 further comprising the step of mounting said substrate, upon completion of said electrodeposition step, on a support member so as to position said magnetically permeable material in close proximity to said magnetizable recording medium.

15. The method of claim 14 in which said support member comprises an arched, anodized aluminum member.

16. The method of claim 3 further comprising the steps of:
   removing said jig and said substrate, including said conductive lines and said electrodeposited magnetically permeable material, as a single assembly from the electroplating apparatus upon completion of said electrodeposition step; and
   potting said assembly in sufficient epoxy to provide support for said substrate and said conductive lines, and to position said magnetically permeable material in close proximity to said magnetizable recording medium.

17. The method of claim 16 further comprising the step of:
   removing excess epoxy and electrodeposited magnetically permeable material to provide a smooth, finished surface; and
   positioning said finished surface in close proximity to said magnetic recording medium.

18. The method of claim 16 further comprising the step of providing a new jig prior to repeating said electrodeposition step.

19. The method of claim 3, further comprising the step of:
mounting said wire cathode on said jig with the aid of a first support member, said first support member being separable from said jig.

20. The method of claim 19, further comprising the steps of:
separating said first support member and said wire cathode, as well as said substrate, including said conductive lines and said magnetically permeable material, from said jig as a single assembly upon completion of said electrodeposition step; and
mounting said assembly on a second support member so as to position said magnetically permeable material in close proximity to said magnetizable recording medium, said second support member having a slot formed therein for accommodating said first support member.

21. The method of claim 20 further comprising the step of:
removing excess magnetically permeable material to provide a smooth, finished surface; and
positioning said finished surface in close proximity to said magnetizable recording medium.

22. The method of claim 21 further comprising the step of:
providing a new first support member and wire cathode prior to repeating said electrodeposition step.

23. The method of manufacturing a magnetic printing head for recording latent magnetic images on a magnetizable recording medium moving relative to said head comprising:
placing a plurality of nonintersecting, conductive word lines on a first insulating substrate, said word lines crossing a first elongated gap in said first substrate, said word lines being insulated along those portions crossing said first gap;
placing a second plurality of nonintersecting, conductive digit lines on a second insulating substrate, said digit lines crossing a second elongated gap in said second substrate, said digit lines being insulated along those portions crossing said second gap;
placing a third plurality of nonintersecting sacrificial conductive lines on a third insulating substrate, said sacrificial lines crossing a third elongated gap in said third substrate, said third gap having substantially the same dimension as said first and second gaps;
affixing said first, second, and third substrates one atop another so that said first, second, and third gaps, respectively, are aligned and such that said respective conductive lines crossing each of said gaps are also aligned, thereby defining vertical spaces between adjacent conductive lines on the same substrate and horizontal spaces between opposed conductive lines on adjacent substrates; and
electrodepositing a magnetically permeable material in said vertical spaces.

24. The method of claim 23 in which said affixing step includes the step of:
filling said horizontal spaces between opposed conductive lines on adjacent substrates with an inert material so that electrodeposition of magnetically permeable material occurs only in said vertical spaces.

25. The method of claim 24 in which said step of filling includes the steps of:
spreading inert material between said first, second, and third substrates; and
forming said vertical spaces by removing said inert material from said vertical spaces with a stream of pressurized gas.

26. The method of claim 23 in which said electrodeposition step comprises:
securing said substrates and said conductive lines in a jig having a wire cathode mounted below and parallel to said gaps, and at least one anode mounted above said substrates; and
immersing said jig, including said substrates and said conductive lines, in an electrolytic solution while maintaining an electrical current flow between said cathode and said anode.

27. The method of claim 26 wherein said electrodeposition step further comprises the step of:
circulating said electrolytic solution through said jig and past said conductive lines crossing said gaps.

28. The method of claim 27 in which said electrolytic solution comprises a mixture of water, orthophosphorous acid, orthophosphoric acid, cobalt carbonate, and hydrated cobalt chloride.

29. The method of claim 27 in which the composition of said mixture per liter of water comprises 50 gm orthophosphorous acid, 50 gm orthophosphoric acid, 33.7 gm cobalt carbonate, and 185 gm hydrated cobalt chloride.

30. The method of claim 27 in which electrolytic solution flow rate is 900 ml/min.

31. The method of claim 27 in which the electrical current is maintained at 120 milliamperes.

32. The method of claim 27 in which said wire cathode comprises nickel-iron wire.

33. The method of claim 27 in which said anode comprises a material selected from the group consisting of platinum and cobalt.

34. The method of claim 27 in which said step of circulating comprises circulating said electrolyte solution through at least one channel formed in said jig so as to direct the flow of said electrolytic solution through said gaps in said substrates.

35. The method of claim 27 in which said jig includes a vented cage disposed on a side of the substrate opposite said wire cathode so as to direct the flow of said electrolytic solution toward said anode.

36. The method of claim 27 further comprising the step of heating said electrolytic solution during said electrodeposition.

37. The method of claim 27 further comprising the step of mounting said substrate on a support member, upon completion of said electrodeposition step, so as to position said magnetically permeable material in close proximity to said magnetizable recording medium.

38. The method of claim 37 in which said supporting member comprises an arched, anodized aluminum member.

39. The method of claim 27 further comprising the steps of:
removing said jig and said substrate, including said conductive lines and said electrodeposited magnetically permeable material, as a single assembly from the electroplating apparatus upon completion of said electrodeposition step; and
potting said assembly in sufficient epoxy to provide support for said substrate and said conductive lines, and to position said magnetically permeable material in close proximity to said magnetizable recording medium.

40. The method of claim 39 further comprising the steps of:

removing excess epoxy and electrodeposited magnetically permeable material to provide a smooth, finished surface; and positioning said finished surface in close proximity to said magnetic recording medium.

41. The method of claim 39 further comprising the step of providing a new jig prior to repeating said electrodeposition step.

42. The method of claim 27, further comprising the step of:

mounting said wire cathode on said jig with the aid of a first support member, said first support member being separable from said jig.

43. The method of claim 42, further comprising the steps of:

separating said first support member and said wire cathode, as well as said substrate including said conductive lines and said magnetically permeable material from said jig as a single assembly upon completion of said electrodeposition step; and mounting said assembly on a second support member so as to position said magnetically permeable material in close proximity to said magnetizable recording medium, said second support member having a slot formed therein for accommodating said first support member.

44. The method of claim 43 further comprising the step of:

removing excess magnetically permeable material to provide a smooth, finished surface; and positioning said finished surface in close proximity to said magnetizable recording medium.

45. The method of claim 44 in which sid electrodeposition step comprises:

providing a new first support member and wire cathode prior to repeating said electrodeposition step.

* * * * *